No. 860,515. PATENTED JULY 16, 1907.
G. A. BEIDLER.
MACHINE FOR WASHING DISHES.
APPLICATION FILED JUNE 19, 1906.

3 SHEETS—SHEET 1.

Witnesses:—
Frank P. Shepard
Albert L. Welsh

Inventor:—
George A. Beidler

No. 860,515. PATENTED JULY 16, 1907.
G. A. BEIDLER.
MACHINE FOR WASHING DISHES.
APPLICATION FILED JUNE 19, 1906.
3 SHEETS—SHEET 2.
*Fig. 3.*
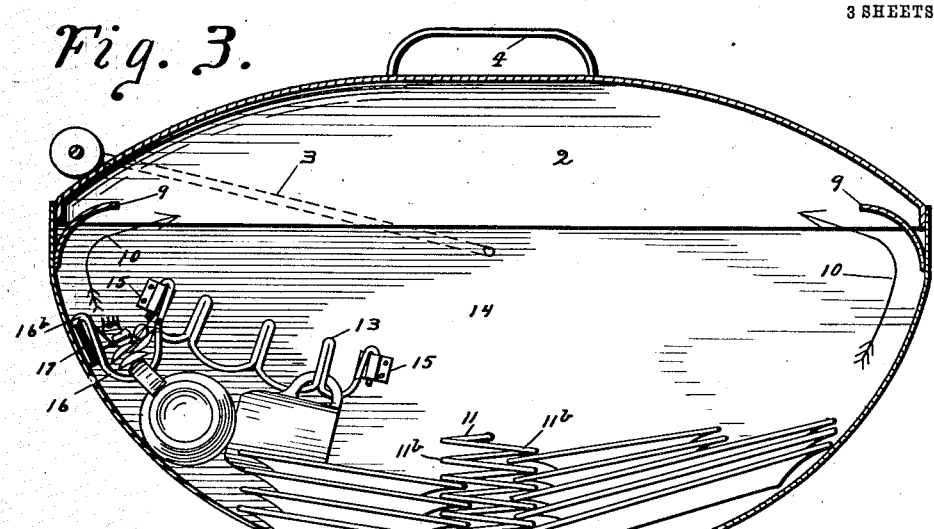
*Fig. 4.*
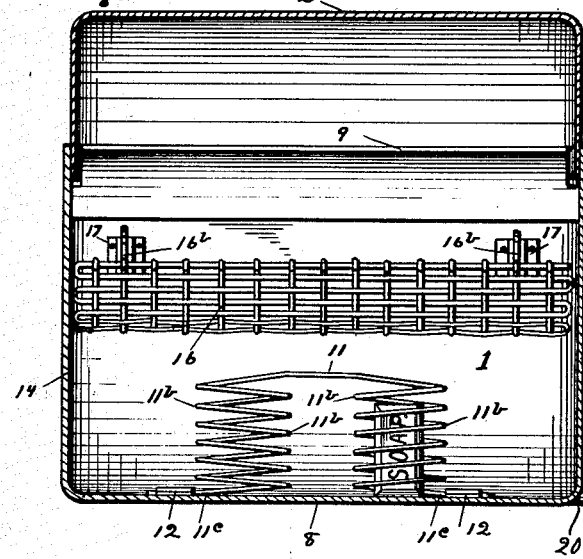
*Fig. 5.*
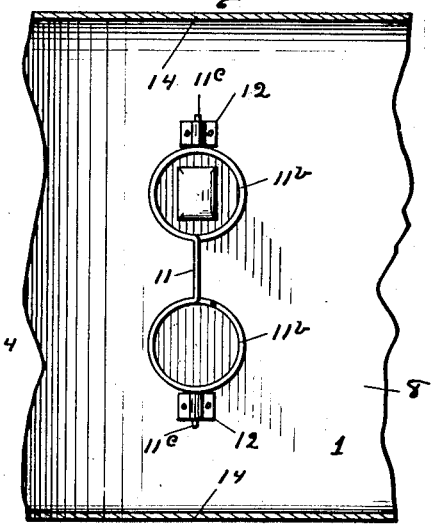
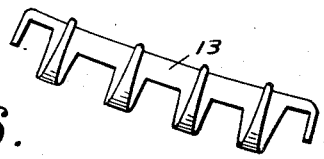
*Fig. 6.*
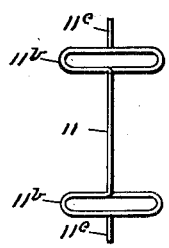
*Fig. 7.*
Witnesses:—
Frank P. Shepard.
Albert L. Welsh.
Inventor:—
George A. Beidler No. 860,515. PATENTED JULY 16, 1907.
G. A. BEIDLER.
MACHINE FOR WASHING DISHES.
APPLICATION FILED JUNE 19, 1906.

3 SHEETS—SHEET 3.

Witnesses:—
Frank P. Shepard
Albert L. Welsh

Inventor:—
George A. Beidler

ID Start -->
UNITED STATES PATENT OFFICE.

GEORGE A. BEIDLER, OF OKLAHOMA, OKLAHOMA TERRITORY.

MACHINE FOR WASHING DISHES.

No. 860,515.  Specification of Letters Patent.  Patented July 16, 1907.

Application filed June 19, 1906. Serial No. 322,401.

*To all whom it may concern:*

Be it known that I, GEORGE A. BEIDLER, a citizen of the United States, residing at Oklahoma, in the county of Oklahoma and Territory of Oklahoma, have invented certain new and useful Improvements in Machines for Washing Dishes, of which the following is a full, clear, and exact description, reference being had to the drawings hereto annexed.

The object of this invention is, to produce a dishwashing device or machine, which will accomplish the object desired in a satisfactory manner, and will be cheap and simple in construction, and in operation.

Figure 1:
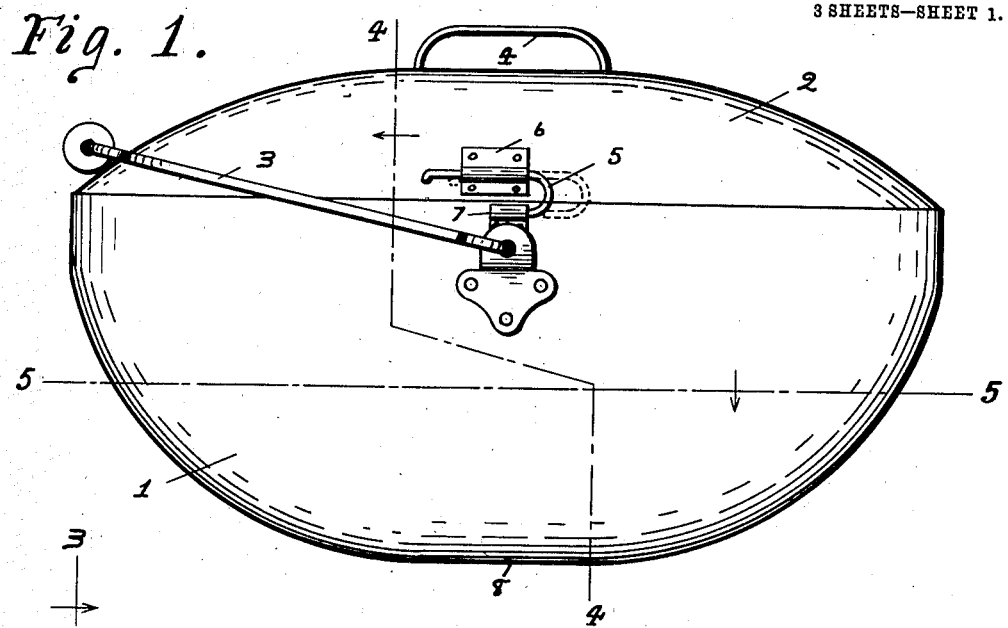
Figure 2:
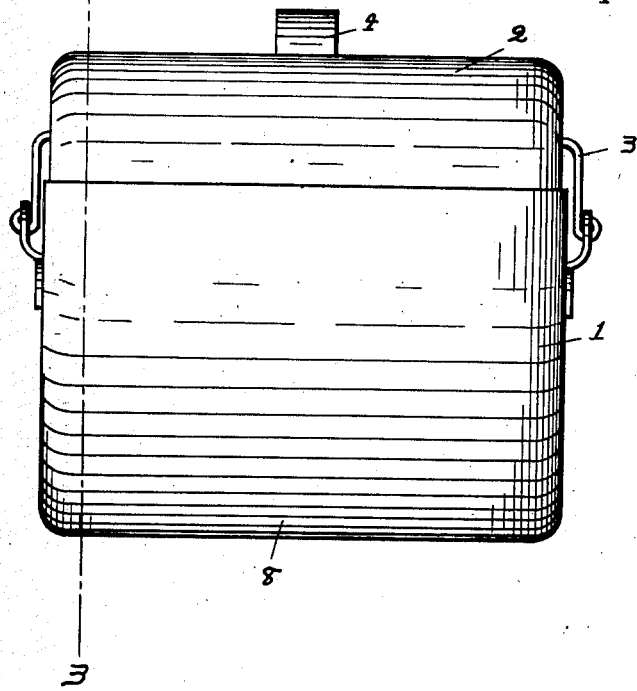
Figure 8:
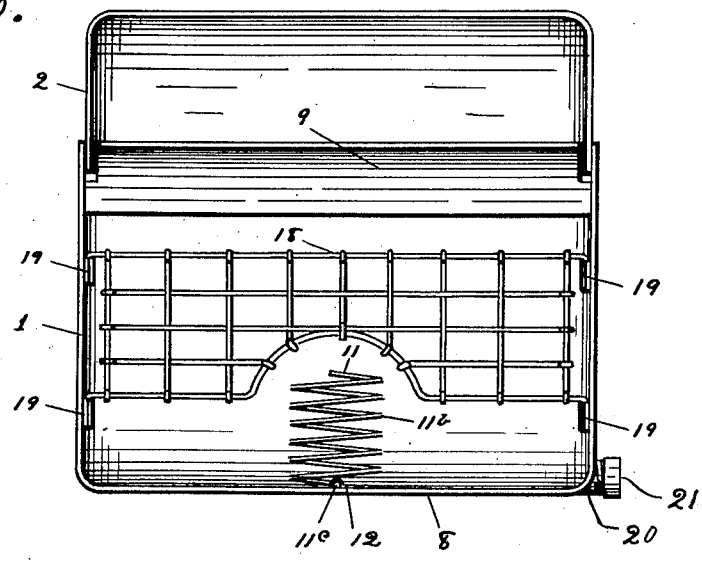
Figures 9, 10:
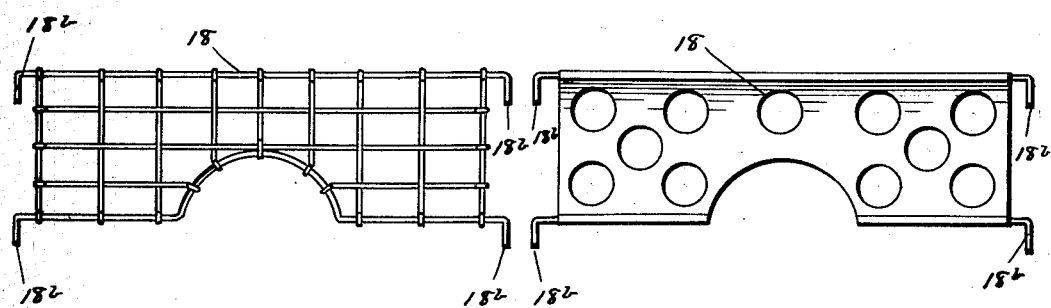

Referring to the drawings: Figure 1 is a side elevation of the improved machine. Fig. 2 is an end elevation. Fig. 3 is a sectional view taken on the line 3—3, of Fig. 2, showing the interior construction and arrangement of the machine, and the dishes and other articles in place for washing. Fig. 4 is a sectional view taken on the line 4—4, of Fig. 1, showing the machine empty and with a slightly modified form of rack or basket for holding knives, forks and the like. Fig. 5 is a sectional plan view taken on the line 5—5, of Fig. 1. Fig. 6 is an elevation view of a modified form of hooked rack for holding cups and like articles. Fig. 7 is a plan view of a modified form of clamping or holding device for holding plates, saucers, and soap in place. Fig. 8 is a sectional view, similar to Fig. 4, but showing an open or perforated partition to keep larger dishes and articles from rolling about in the machine. Figs. 9 and 10 are separate views showing optional methods of constructing the partition.

Referring to the several figures, in all of which like characters of reference designate like parts, the machine comprises a main body or inclosing casing 1, and a lid portion 2 which fits tightly onto and closes said casing. These parts may be made of any suitable material, but sheet tin or galvanized sheet iron have been found preferable. The casing 1 is provided with a bail or handle 3 so that it may be readily carried or handled, and the lid 2 is also provided with a handle 4. As a means of locking the lid 2 onto the casing 1, a U-shaped member 5 is mounted on each side thereof, one arm of said member being slidably retained under a sheet-metal clip 6 riveted to the lid, and the other arm being adapted to slide into a like clip or lug 7 secured to the casing. Each end of the casing 1 is curved upward on its under side, as shown in Fig. 1 and 3, so as to allow the whole machine to be rocked from end to end, and in using the machine the dishes are placed into it and covered with a sufficient amount of water. Then by rocking the casing 1 from end to end on its curved bottom 8 the water is agitated and thrown forcibly among the dishes from one end of the machine to the other. In order that the water, in being thrown from end to end of the casing, may not pass out through the joint between said casing and the lid 2, a curved deflecting tongue 9 is soldered to the bottom 8 at each end of the interior, and said tongue turns the water in the direction indicated by the arrows 10 in place of allowing it to pass out through the joints. Owing to the considerable length of the bottom 8 a large number of dishes and articles may be placed upon it, and as the water is agitated and forced from one end of the dishwasher to the other end, and thus deluges the dishes and articles to be washed with water over and over again, and as the same is being thus rocked to and fro, by reason thereof, a much smaller amount of water is required to do the washing, than if the shape and movements of the machine were otherwise.

In placing the dishes in the machine, the larger ones, such as plates, saucers, and like articles are placed in the central bottom portion as shown in Fig. 3, and in order to hold them from sliding about during the rocking of the machine a yielding clamping device 11 is employed and secured removably to the bottom 8 of the machine. This device 11 is formed of a single piece of spring wire rod which is coiled into two helixes $11^b$ secured integrally together at their upper ends. The lower ends of the helixes are formed into supporting feet $11^c$ which slide removably under sheet-metal lugs 12 riveted to the bottom of the casing 1. The clamping device 11 may consist of one or any number of helix portions $11^b$, and in place of being perfectly circular as shown in Fig. 5, the helices may be formed oblong, as shown separately in Fig. 7.

For holding cups and smaller dishes, a hooked rack 13 is hung removably onto the sides 14 of the casing, and the ends of said rack are inserted removably down into lugs 15 secured to said sides. This rack may be formed of a single piece of wire bent into the proper form as shown in Fig. 3, or it may be formed of sheet metal, as shown in Fig. 6.

In order to hold knives, forks and like articles without losing them among the dishes, a supporting basket or rack 16 is mounted at the end of the casing 1. This basket may be in the form of a hooked rack, like the rack 13 in Fig. 3, or it may be formed of woven screen wire, as shown in Fig. 4, the basket being provided with hooks $16^b$ which slip removably down into lugs 17 secured to the casing 1.

As an additional means of preventing larger dishes from rolling about in the machine during the rocking movement thereof, an open or perforated partition 18 is mounted across the casing 1 at or near the clamping device 11, and this partition may be used with said clamping device, or with said clamping device removed from the machine. This partition 18 is provided at each end with downwardly-extending projections 18$^b$ which extend removably down behind sheet metal clips 19 secured to the sides 14 of the casing. The partition 18 may be formed of woven wire as shown in Fig. 9, or it may be made out of sheet metal, and be provided with perforations 18$^c$, as shown in Fig. 10. When formed of sheet metal pieces of wire rod are rolled into the upper and lower edges of the partition 18, and the outer end of said rod are bent downward to form the fingers 18$^b$. An out-let opening for draining the water from the casing 1 is provided, as at 20, and said opening is provided with the usual screw-threaded cap 21.

It is obvious that other forms of clamping, supporting, and retaining devices may be provided in the machine for plates, saucers, knives, forks and the like, and the inventor desires not to be limited to the specific forms of construction and arrangement herein set forth, farther than pointed out in the appended claims.

The construction and arrangement of parts as described have been found to be practically operative, and to fully attain the objects of the invention.

What I claim and desire to secure by Letters Patent is:

1. A casing having a bottom rounded upward at its ends, a lid for the casing, said casing being adapted to contain water and the articles to be washed, a deflecting flange mounted below the joint line of the casing and lid, a removable clamping device within the casing comprising spring-wire helices, said helices having each a foot extending removably under a retaining clip.

2. A casing adapted to contain water and the articles to be washed, said casing being adapted to be moved to agitate the water, an elastic helix mounted in the bottom of the casing and having a foot extending removably under a retaining clip on the casing bottom, a removable rack on the side of the casing, a removable tray at the end of the casing, a lid on the casing, a curved deflecting tongue mounted below the joint line of the lid and casing.

3. A casing having a bottom rounded upward at its ends, said casing being adapted to contain a supply of water and the articles to be washed, a removable partition extending transversely of the casing.

Witness my hand this 8th day of June, 1906.

GEORGE A. BEIDLER.

Witnesses:
FRANK P. SHEPARD,
ALBERT L. WELSH.